United States Patent [19]
Freneaux et al.

[11] Patent Number: 5,418,350
[45] Date of Patent: May 23, 1995

[54] COAXIAL NOZZLE FOR SURFACE TREATMENT BY LASER IRRADIATION, WITH SUPPLY OF MATERIALS IN POWDER FORM

[75] Inventors: Olivier Freneaux, Eschau; Jean B. Poulet, Lingolsheim; Olivier Lepre, Ottrott; Ghislain Montavon, Granges-le-Bourg, all of France

[73] Assignees: Electricite de Strasbourg (S.A.); Institut Regional de Promotion de la Recherche Appliquee, both of Strasbourg, France

[21] Appl. No.: 108,704

[22] PCT Filed: Jan. 7, 1993

[86] PCT No.: PCT/FR93/00009
§ 371 Date: Nov. 8, 1993
§ 102(e) Date: Nov. 8, 1993

[87] PCT Pub. No.: WO93/13871
PCT Pub. Date: Jul. 22, 1993

[30] Foreign Application Priority Data
Jan. 7, 1992 [FR] France .................................. 92 00176

[51] Int. Cl.[6] ....................... B23K 26/00; B23K 26/14

[52] U.S. Cl. ...................... 219/121.84; 219/121.64
[58] Field of Search ..................... 219/121.63, 121.64, 219/212.84, 121.6

[56] References Cited

U.S. PATENT DOCUMENTS

5,111,021  5/1992  Jolys et al. ........................ 219/121.6
5,321,228  6/1994  Krause et al. ..................... 215/121.84

*Primary Examiner*—Mark H. Paschall
*Attorney, Agent, or Firm*—Young & Thompson

[57] ABSTRACT

A surface treatment nozzle for laser irradiation, with the supply of material in powder form is characterized in that it is essentially constituted, on the one hand, by a nozzle body (1) provided with a truncated conical passage (2) that converges in the direction of the outlet of the nozzle (3) along the propagation axis (6') of the laser beam (6) and, on the other hand, by a coaxial injection device (4) for guidance of the materials (5) in powder form carried by a transport fluid within the nozzle body (1) so as to improve the interaction between the incident laser beam (6) and the materials (5) in powder form.

11 Claims, 2 Drawing Sheets

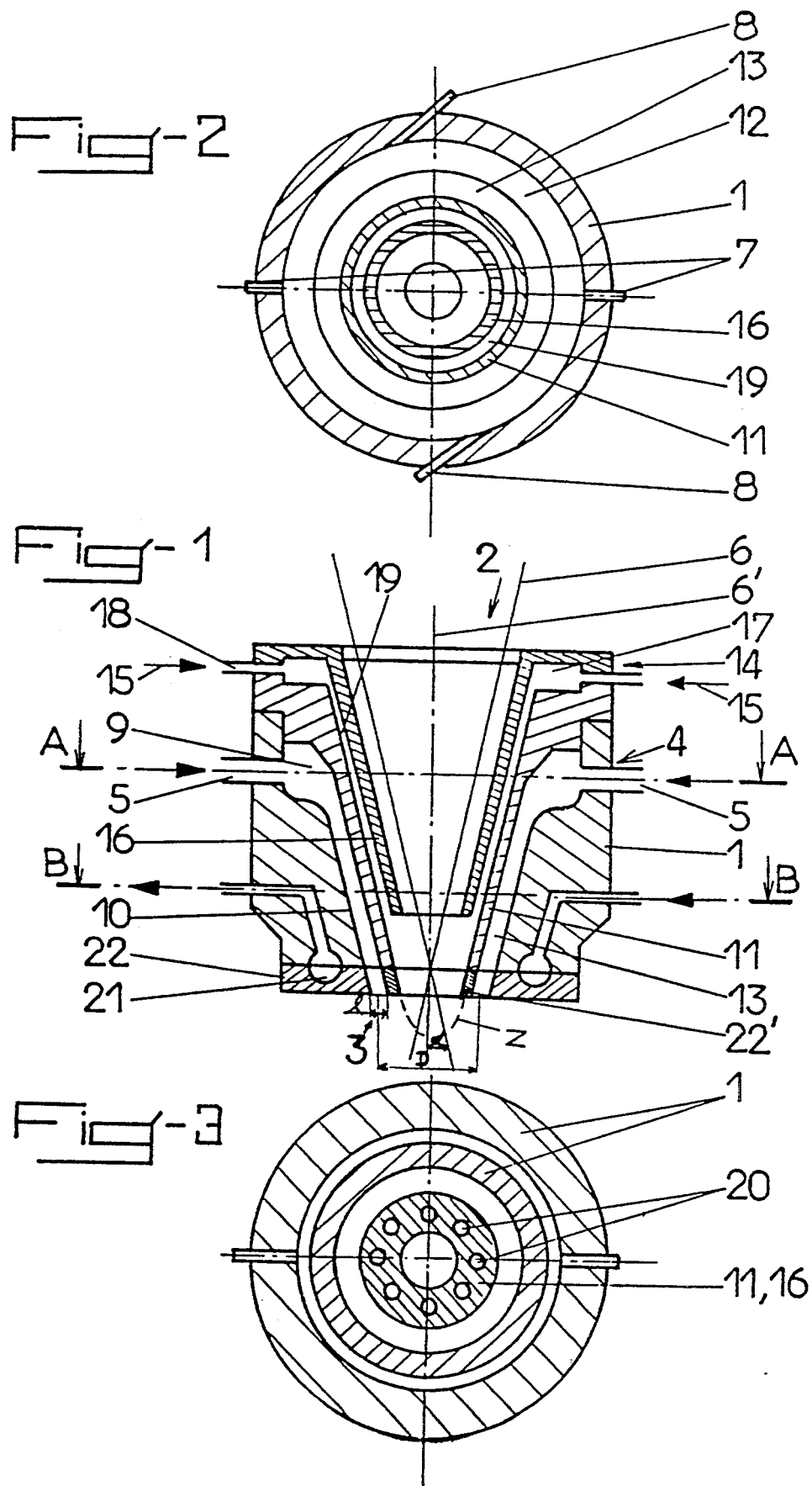

Fig_4
Fig_5
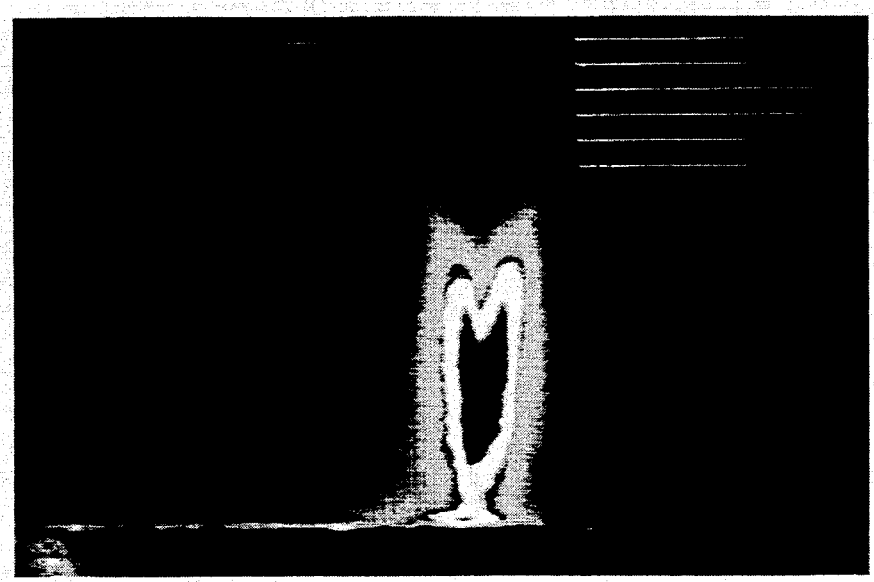
Fig_6

COAXIAL NOZZLE FOR SURFACE TREATMENT BY LASER IRRADIATION, WITH SUPPLY OF MATERIALS IN POWDER FORM

FIELD OF THE INVENTION

The present invention relates to metallurgy, more particularly techniques of surface treatment by coating or producing surface alloys, and has for its object a nozzle for surface treatment with supply of materials in powder form by laser irradiation, of the coaxial type.

BACKGROUND OF THE INVENTION

The manner of operation of such a coaxial nozzle consists in injecting into a high-power laser beam passing through said nozzle, one or more materials in powder form, also called hard surfacing materials, carried by a fluid, so as to produce, after melting of the materials, a superficial coating layer on the piece to be treated while assuring an excellent adherence by intimate reflow melting of the surface of said piece, or a surface alloy by deep and controlled reflow melting with the material constituting said piece.

This type of nozzle has a structure permitting the free passage of the laser beam and the supply of materials in the form of powder in a peripheral manner, permitting multi-axial treatments, in the three spatial dimensions.

Nevertheless, the quality of the treatment obtained by means of such a nozzle depends particularly on the quantity and the intrinsic properties of the powder supplied to the incident laser beam and on its interaction with said beam, as well as the shape of the resulting jet at the outlet of the nozzle.

Moreover, the possibility of shaping the jet at the outlet of the nozzle permits, on the one hand, to vary the different parameters of treatment such as the region of application, and the intensity of treatment, the distribution of the particles in the impact zone, etc., and, on the other hand, to increase the calorific output of the operation, by coupling in an optimum way the jet of surface hardening materials with the incident laser beam.

Moreover, at present, the hard surfacing materials are generally injected into the laser beam in an empirical way, without using specific supply devices, nor using means to shape the emitted jet. As a result, a large part of the hard surfacing materials are not irradiated by the incident laser beam and therefore do not take part in the treatment of the resulting surface. Furthermore, the shape of the jet as well as the distribution of the particles in said jet, depending directly on the injection device for the hard surfacing materials, cannot in any case be controlled.

SUMMARY OF THE INVENTION

The present invention has for its object to overcome all of the above drawbacks.

To this end, it has for its object a coaxial nozzle for surface treatment by laser irradiation, with the supply of materials in powder form, characterized in that it is essentially constituted, on the one hand, by a nozzle body provided with a truncated conical passage converging in the outlet direction of the nozzle along the axis of propagation of the laser beam and, on the other hand, by a coaxial injection device, for guiding and shaping a jet of materials, in the form of powder, carried by a transport fluid in said nozzle body and, finally, by an injection device for a confining fluid and pressurizing or generating an underpressure in said treatment nozzle, in the form essentially of a second truncated partition ring extending in a coaxial way within a first partition ring so as to improve the interaction between the incident laser beam and the materials in powder form.

BRIEF DESCRIPTION OF THE DRAWINGS

The invention will be better understood from the following description, which relates to preferred embodiments, given by way of non-limiting examples, and explained with reference to the accompanying schematic drawings, in which:

FIG. 1 is a side elevational cross-sectional view of a treatment nozzle according to the invention;

FIG. 2 is a cross section on the line A—A of the treatment nozzle shown partially in FIG. 1;

FIG. 3 is a cross-sectional view on the line B—B of the treatment nozzle partially shown in FIG. 1, according to a modification of the invention, and, FIGS. 4, 5 and 6 are photographs of jets emitted by the treatment nozzle according to the invention.

DETAILED DESCRIPTION OF THE INVENTION

According to the invention, and as shown particularly in FIG. 1 of the accompanying drawings, the treatment nozzle is essentially constituted, on the one hand, by a nozzle body 1 provided with a truncated conical passage 2 converging in the outlet direction of the nozzle 3 along the axis of propagation 6' of the laser beam 6 and, on the other hand, by a device 4 for the coaxial injection, guidance and shaping of a jet 5 of materials in the form of powder carried by a transport fluid in said nozzle body 1 and, finally, by a device 14 for the injection of a confining fluid 15 to compress or to generate an underpressure in said treatment nozzle, in the form essentially of a second truncated partition ring 16 extending coaxially within a first partition ring 11, so as to improve the interaction between the incident laser beam 6 and the materials 5 in the form of injected powder and to permit divergence of the laser beam.

According to a first characteristic of the invention, shown in FIGS. 1 and 2 of the accompanying drawings, the device 4 for coaxial injection and guidance is principally comprised by one or several tangential and/or radial injection orifices 7, 8 opening into an injection chamber 9 confined by the internal wall 10 of the nozzle body 1 and a truncated conical partition ring 11 mounted on the body of nozzle 1 and disposed essentially coaxially within the passage 2 of said nozzle body 1.

Injection chamber 9 comprises preferably a circumferential chamber 12 for mixing, into which open the injection orifices 7, 8, prolonged by a truncated conical annular space 13 for the guidance of the material 5 in the form of injected powder, opening adjacent the nozzle outlet 3.

Thus, the hard plating materials 5 carried by a transport fluid are conveyed to the immediate proximity of the laser beam 6 and are introduced circumferentially and uniformly into the latter, permitting the provision of a maximum surface interface and promoting maximally the integration of the jet of materials 5 into the laser beam 6.

Moreover, the distribution of the materials 5 in powder form in the transport fluid is rendered uniform by the fact of their passage within the circumferential chamber 12, promoting the interaction between the two-phase jet of materials 5 emitted by the incident laser beam 6 and accordingly increasing the quality of the treatment effected.

As shown more particularly in FIG. 2 of the accompanying drawings, the coaxial injection and guidance device 4 comprises preferably two tangential injection orifices 7 and two radial injection orifices 8, distributed uniformly and in two-by-two opposition about the periphery of nozzle body 1.

The possibility of being able to use, alternatively, either a radial injection mode or a tangential injection mode, this as a function particularly of the nature of the mass flow rate of the materials 5 in powder form, permits modifying over a wide range the morphology of the jet of materials 5 emerging from the treatment nozzle and the distribution of the particles in its midst.

The geometry of the treatment nozzle according to the invention can be characterized essentially by values of the half-angle $\alpha$ of the ejection cone, of the mean diameter D of the injection annulus and the width I of said annulus, determined by the size and configuration of the truncated conical passage 2 of the nozzle body 1 and of the partition ring 11 (FIG. 1).

An optimum interaction between the jet of materials 5 in powder form and the incident laser beam 6 has been obtained, for the treatment nozzle shown in FIG. 1 of the accompanying drawings, with a value of the half-angle of the injection cone $\alpha$ comprised between 15° and 20°, preferably equal to 17°, a mean value of the diameter of the injection annulus D comprised between 4 millimeters and 10 millimeters, preferably equal to 7 millimeters, and a width I of the injection annulus comprised between 0.5 millimeter and 2.0 millimeters, preferably equal to 0.8 millimeter.

Moreover, and according to another characteristic of the invention, the carrier fluid is preferably a gas, preferably inert such as helium or argon so as to eliminate the risk of the plasma being unsuitable for good operation and assuring a good gaseous protection against oxidation of the produced coating. Their volumetric flow rate, under standard conditions, is comprised between $1.5 \times 10^{-5}$ and $35 \times 10^{-5}$ m$^3$/s, as a function of the nature of the materials 5.

By way of example, when the materials 5 consist in particles of material known under the designation Stellite grade 6, this latter can preferably be applied on a substrate by means of a treatment nozzle having a half-angle of injection cone of the order of 17° and a mean diameter of injection annulus of the order of 7 mm, and the thickness of the injection annulus being 0.8 mm. In this case, the transport fluid is preferably argon having a volumetric flow rate of $6 \times 10^{-5}$ m$^3$/s.

So as to be able to modify the morphology of the material jet 5 at the outlet of the nozzle 3 in the course of a treatment operation, while acting on the one hand on the zone Z called the "dead zone", situated adjacent the outlet of the nozzle 3 and characterized by a zero flow rate, and on the other hand under the conditions of flow in a free jet by reduction of the dimensions of the jet and homogenization of the flow speeds of the material, the treatment nozzle according to the invention comprises also as previously indicated, a device 14 for the injection of a confining fluid 15 at a positive pressure or for generation of an underpressure in said treatment nozzle, permitting shaping the resulting jet 5 of materials independently of the geometric configuration of said treatment nozzle and to optimize the interaction between the materials 5 injected in powder form and the laser beam 6, by reduction of said "dead zone" and modification of the nature of the flow.

This device 14 is essentially as shown in FIG. 1 of the accompanying drawings, in the form of a second truncated conical partition ring 16 mounted securely and within the treatment nozzle and extending essentially in a coaxial manner into the first partition ring 11, and delimiting and comprising a circumferential confinement chamber 17, connected to the injection orifices 18 and prolonged by a guide space 19, of truncated conical shape, opening not far from the outlet of the nozzle 3 within the first partition ring 11.

The injection, under the given pressures and flow rates, of a confinement fluid 15, for example a gas, or the generation by aspiration of an underpressure of given intensity within the treatment nozzle, by means of the device 14, involves a focusing of the material jet 5 at the outlet of the nozzle 3 in the laser beam 6 and the limitation of the dispersion of the material particles 5 outside said beam.

The influence of the operation of the device 14 is nicely shown in FIGS. 4 to 6 of the accompanying drawings which show the morphology of a material jet 5 obtained at the outlet of a treatment nozzle, respectively, without use of the device 14 (FIG. 4) and with injection of a confinement fluid 15 at an overpressure (FIG. 5) or at an underpressure (FIG. 6).

According to a characteristic of the invention, the first and second partition rings 11 and 16 can be formed of a single piece, the truncated guide space 19 being present in the form of a plurality of channels 20 extending between the two partition rings 11 and 16 (FIG. 3).

According to a modification of the invention, shown in FIG. 2 of the accompanying drawings, the truncated conical guide space 19 is present in the form of a continuous annular space extending between the two partition rings 11 and 16.

So as to limit the temperature rise of the treatment nozzle, the nozzle body 1 is provided, in its lower portion adjacent the outlet of the nozzle 3, with a cavity or an annular circumferential conduit 21 traversed by a cooling liquid.

According to a supplemental characteristic of the invention, shown in FIG. 1 of the accompanying drawings, the partition ring and/or the nozzle body 1 comprise removable ferrules 22, 22', provided in a material that can resist large temperature stresses.

Thanks to the invention, it is therefore possible to provide a coaxial nozzle for surface treatment by laser irradiation, with the supply of material in powder form, permitting the provision of multidirectional treatments that are variable and controlled, by optimizing the interaction between the injected materials in powder form and the laser beam 6 and by shaping the resulting jet as a function of the treatment to be performed.

Of course, the invention is not limited to the embodiments described and shown in the accompanying drawings. Modifications remain possible, particularly as to the construction of the various elements, or by substitution of various elements, or by substitution of technical equivalents, without thereby departing from the scope of protection of the invention.

We claim:

1. Coaxial nozzle for surface treatment by irradiation with a laser beam and a supply of materials in powder form, comprising: a nozzle body (1) having an outlet, said nozzle body being provided with a truncated conical passage (2) that converges in the direction of the outlet along an axis (6') of propagation of the laser beam (6); a coaxial injection device (4) which guides and shapes a jet (5) of materials in powder form carried by a transport fluid in said nozzle body (1), said coaxial injection device comprising a first truncated conical partition ring (11) mounted in the nozzle body (1); and a device (14) for the injection of a confining fluid (15) at an overpressure or for the generation of an underpressure in said treatment nozzle, in the form essentially of a second truncated conical partition ring (16) extending coaxially within the first partition ring (11), so as to improve the interaction between the laser beam (6) and the materials (5) in powder form.

2. Nozzle according to claim 1, wherein the coaxial injection device (4) for guidance is principally comprised by one or several injection orifices (7, 8) which are tangential and/or radial, opening into an injection chamber (9) delimited by an internal wall (10) of the nozzle body (1) and the first truncated conical partition ring (11), disposed essentially in a coaxial manner within the passage (2) of the nozzle body (1).

3. Nozzle according to claim 2, wherein characterized in that the injection chamber (9) comprises a circumferential homogenization chamber (12) into which open the injection orifices (7, 8), prolonged by a truncated conical annular space (13) for guiding the injected materials (5) in powder form, opening adjacent the nozzle outlet (3).

4. Nozzle according to claim 2, wherein the coaxial injection device (4) for guidance comprises two tangential injection orifices (7) and two radial injection orifices (8), spaced uniformly and pairwise opposite about the circumference of the nozzle body (1).

5. Nozzle according to claim 2, further having an injection cone ($\alpha$) whose value of its half-angle is comprised between 15° and 20°, an injection annulus (D) whose mean diameter is comprised between 4 millimeters and 10 millimeters, and a width (l) of the injection annulus comprised between 0.5 millimeter and 2.0 millimeters.

6. Nozzle according to claim 5, wherein the transport fluid is an inert gas, so as to eliminate the risk of plasma being unsuitable for good operation and ensuring a good gaseous protection against oxidation of the produced coating, with a volumetric flow rate, under standard conditions, being comprised between $1.5 \times 10^{-5}$ and $35 \times 10^{-5}$ m$^3$/s.

7. Nozzle according to claim 1, wherein the device (14) for the injection of the confining fluid comprises a circumferential confinement chamber (17), connected to injection orifices (18) and prolonged by a guide space (19), of truncated conical shape, opening in the vicinity of the outlet of the nozzle (3), within the first partition ring (11), said device for the injection of the confining fluid permitting to shape the resulting jet (5) of materials independently of the geometric configuration of the nozzle, and to optimize the interaction between injected materials (5), in powder form, and the laser beam (6), by reduction of a zone situated adjacent the outlet and having zero flow rate.

8. Nozzle according to claim 1, wherein the first and second partition rings (11 and 16) are of a single piece.

9. Nozzle according to claim 7, wherein the truncated conical guide space (19) is in the form of a continuous annular space, or in the form of a plurality of channels (20), extending between the two partition rings (11 and 16).

10. Nozzle according to claim 1, wherein the nozzle body (1) is provided in its lower portion adjacent the outlet of the nozzle (3) with a circumferential annular conduit (21) traversed by a cooling liquid.

11. Nozzle according to claim 1, wherein at least one of the first partition ring (11) and the nozzle body (1) comprises removable ferrules (22, 22'), of a material which can resist large thermal stresses.

\* \* \* \* \*